Patented Sept. 12, 1933

1,926,560

UNITED STATES PATENT OFFICE 1,926,560

FURNITURE

Lawrence V. Redman, Caldwell, N. J., assignor to Bakelite Corporation, New York, N. Y., a corporation of Delaware No Drawing. Application May 16, 1928
Serial No. 278,341

3 Claims. (Cl. 5—280)

This invention relates to improvements in articles of furniture and is hereinafter described specifically in connection with bed ends for the purpose of disclosure.

The invention is based upon a substitution of materials whereby new and useful properties are imparted to articles of furniture made therefrom. Wood has been the most desirable material for the manufacture of furniture, and in spite of many obvious disadvantages continues to be so on account of its esthetic appeal, its low heat conductivity or lack of coldness to the touch, softness as compared with metal, etc. While metal has been advocated and largely adopted as a substitute for wood, particularly on account of its sanitary properties, it has been found commercially desirable to closely simulate the appearance of wood; such simulation not only involves extravagant waste of material, but it furthermore gives a heavy cumbersome article lacking in addition the highly desirable properties of low heat conductivity, etc., that have been instrumental in maintaining the supremacy of wood.

According to the present invention an improved bed end or equivalent structure is provided that is superior to one made from wood in its antiseptic nature and chemical inertness, but which is light in weight and has a low heat conductivity commensurate with that of wood. Like metal it is shaped by dies or molds, thus obviating the labor cost of duplication necessary with wood, but unlike metal it can be molded with a surface finish and sharpness of detail that is pleasing and satisfactory without the addition of any coating or the expenditure of labor after the molding operation.

The invention in brief comprises articles of furniture, such as bed ends, molded from a composition containing a phenol-formaldehyde or equivalent resinous binder and a filler that is largely or wholly composed of natural fibers, preferably of the hemp family, as sisal, manila, hemp, jute, and in lengths long enough to overlap and to impart the characteristics of strength and elasticity to the composition. I regard the filler as constituting an essential feature of the composition, for, so for as I am aware, moldable compositions containing phenolic resinous binders and other types of fillers, have not been applied heretofore with any degree of success to the manufacture of articles of this nature, due to the large surfaces and other structural features requiring strength and shock resistance not present in the compositions. Likewise laminated materials comprising layers of paper or cloth bonded with phenolic resinoids are not adaptable to the manufacture of furniture, nor do they have the requisite three-dimensional strength. Long sisal or equivalent fibers, however, as a filler yield a composition of surprising strength and shock resistance, withstanding breakage and distortion tests commensurate with actual normal usage.

As indicated, the fibers are long enough to appreciate overlap in the composition, that is, they are a quarter inch to an inch or more in length and their inherent strength thus utilized. They are hereinafter designated as long to differentiate them from fibers that are so short that they do not materially add to the strength of the composition. The fibers found satisfactory for the purposes of this invention, as sisal, manila, hemp, etc., are further characterized by stiffness and springiness or elasticity, and to these properties I attribute in a large measure the strength and shock resistance found in the molded articles, the fibers apparently absorbing impacts and preventing breakage.

The resinous binder used with the filler is preferably a phenol-formaldehyde resinoid, that is, a material which in its A stage is soluble and fusible, but convertible by the application of heat to a C stage or a substantially insoluble and infusible condition. The binder may be incorporated as a powdered solid with the filler; but as the composition is intended to be marketed as such to be molded by others into articles of furniture, it is preferred to add the binder in such a manner that it is not materially separated from the filler in the course of shipping and handling. This is preferably accomplished by coating the fibers with a solution or varnish containing the binder in substantially the A condition dissolved in alcohol, acetone or the like and then removing the solvent, preferably under a vacuum and with heating at low temperatures to avoid any material advancement or polymerization of the resinoid. The composition so obtained is ready for molding, but as it is bulky, due to the stiffness of the fibers and their tendency to remain apart, the composition can be passed through a ball mill to reduce the bulkiness without substantial separation of the binder. The proportions of resinoid and filler can be varied within wide limits; but about equal proportions by weight have been found to be satisfactory in practice.

In the manufacture of articles from this composition a polished mold is first prepared of steel having the configuration of the article. The mold is charged with the composition, and heavy pressure together with heat is applied. During this operation the resinoid binder is polymerized or converted to a C or a substantially insoluble, infusible condition; and when sufficiently transformed, the heat and pressure are removed and the article is discharged. For example in the manufacture of bed ends, a mold of a size sufficient to mold the entire end in one operation is constructed, and it is charged with a composition preferably consisting of about 50 per cent sisal fibers and about 50 per cent resinoid applied as a coating to the fibers. Before charging the mold, however, it is desirable that the composition be uniformly preheated to about 100° C.; this reduces the molding period and promotes a better molded product. A pressure of about 1000 to 3000 pounds or more to the square inch is applied, depending upon the complexity of the design, while the mold is heated to a temperature of about 150 to 175° C. A bed end that in the completed compressed form averages about one half of an inch or so in thickness requires at these temperatures a molding period of about 15 to 25 minutes to secure the desired polymerization. The mold is then cooled somewhat, generally to about 100° C., and the piece discharged.

The piece as discharged has a high gloss dependent upon the polish of the mold and the resinoid content. Designs upon the surface are also sharply and accurately reproduced, particularly if the surface be rich in resinoid; such a condition can be obtained by dusting the mold before molding with powdered resinoid, then charging it with the composition and, if desired, supplying additional amounts of powdered resinoid on the charge before full pressure is applied.

The article can be varnished or otherwise coated as desired. This may be desirable when a composition low in resinoid has been used or no enrichment of the surface has been made.

Other filling materials can be used in conjunction with the sisal or equivalent fibers, such as wood flour, clay, barytes, etc. It is desirable, however, that the fibers constitute the major portion of the filler to insure strength and shock resistance.

I claim:

1. As a new article of manufacture, furniture comprising a molded body of a mixture of phenolic resinoid binder and long natural fibers of the hemp family as a filler.

2. As a new article of manufacture, furniture comprising a molded body of a mixture of phenolic resinoid binder and long sisal fibers as a filler.

3. As a new article of manufacture, a bed end comprising a molded body of a mixture of phenolic resinoid binder and long sisal fibers as a filler.

LAWRENCE V. REDMAN.